United States Patent [19]
Jenkins

[11] Patent Number: 6,056,426
[45] Date of Patent: May 2, 2000

[54] MONOLITHIC BEAM SHAPING LIGHT OUTPUT LIGHT DEVICE

[75] Inventor: David R. Jenkins, Chicago, Ill.

[73] Assignee: Federal Signal Corporation, Oak Brook, Ill.

[21] Appl. No.: 09/162,694

[22] Filed: Sep. 28, 1998

[51] Int. Cl.[7] .................................................. F21V 11/00
[52] U.S. Cl. ........................ 362/558; 362/551; 362/554; 362/511
[58] Field of Search ................................. 362/511, 551, 362/543, 544, 554, 582, 558

[56] References Cited

U.S. PATENT DOCUMENTS

| | | |
|---|---|---|
| 4,529,264 | 7/1985 | Schmidt et al. . |
| 4,805,984 | 2/1989 | Cobb, Jr. . |
| 4,868,718 | 9/1989 | Davenport et al. . |
| 4,949,277 | 8/1990 | Trovato et al. . |
| 4,952,022 | 8/1990 | Genovese . |
| 4,958,263 | 9/1990 | Davenport et al. . |
| 4,964,692 | 10/1990 | Prescott ............................. 362/554 |
| 5,147,128 | 9/1992 | Windross . |
| 5,217,290 | 6/1993 | Windross . |
| 5,257,168 | 10/1993 | Windross . |
| 5,278,731 | 1/1994 | Davenport et al. . |
| 5,309,544 | 5/1994 | Saxe . |
| 5,339,382 | 8/1994 | Whitehead . |
| 5,422,792 | 6/1995 | Neumann . |
| 5,434,754 | 7/1995 | Li et al. . |
| 5,436,806 | 7/1995 | Kato . |
| 5,452,188 | 9/1995 | Green et al. . |
| 5,499,166 | 3/1996 | Kato et al. . |
| 5,506,929 | 4/1996 | Tai et al. . |
| 5,544,029 | 8/1996 | Cunningham . |
| 5,550,716 | 8/1996 | Dassanayake et al. . |
| 5,562,335 | 10/1996 | Okuchi et al. .......................... 362/511 |
| 5,574,328 | 11/1996 | Okuchi . |
| 5,575,550 | 11/1996 | Appledorn et al. . |
| 5,577,492 | 11/1996 | Parkyn, Jr. et al. . |
| 5,577,493 | 11/1996 | Parkyn, Jr. et al. . |
| 5,601,345 | 2/1997 | Tackett . |
| 5,601,354 | 2/1997 | Horii et al. ............................. 362/511 |
| 5,602,948 | 2/1997 | Currie . |
| 5,608,837 | 3/1997 | Tai et al. . |
| 5,676,445 | 10/1997 | Kato ...................................... 362/511 |
| 5,685,627 | 11/1997 | Kato . |
| 5,921,671 | 7/1999 | Okuchi et al. ......................... 362/511 |

OTHER PUBLICATIONS

W. J. Cassarly, J. M. Davenport, and R. L. Hansler, "Distributed Lighting Systems: Uniform Light Delivery," Feb. 1995.

David R. Jenkins, Ben Wang, Sam Banerjee, and Jianzhong Jiao, "Low Beam Head Lamp Design Using Distributive Lighting System," SAE Publication, Feb. 26–29, 1996.

*Primary Examiner*—Thomas M. Sember
*Attorney, Agent, or Firm*—Leydig, Voit & Mayer, Ltd.

[57] ABSTRACT

A monolithic light output device with a unitary construction is coupled to an optical fiber or light pipe to produce an output beam. The light output device has an elongated beam shaping rod connected to a solid lens by a conical transition section. The beam shaping rod modifies the distribution of the light from the optical fiber or light pipe by means of total internal reflection at its peripheral wall. The light passing through the beam shaping rod forms a modified light source at the end of the rod. The solid lens projects the modified light source outward to form the output beam. A controlled beam pattern with sharp beam edges is produced by forming the wall of the conical section at an expansion angle that is equal or larger than the maximum exit angle of the light from the modified light source. Local surface slope variations provided on the peripheral wall of the beam shaping rod redirect the light passing through the beam shaping rod to result in a desired beam distribution.

26 Claims, 5 Drawing Sheets

MONOLITHIC BEAM SHAPING LIGHT OUTPUT LIGHT DEVICE

FIELD OF THE INVENTION

This invention relates generally to distributive lighting systems, and more particularly to a light output device for use in a distributive lighting system.

BACKGROUND OF THE INVENTION

Distributive lighting systems have found many applications in different environments, such as automobiles, offices, houses, etc. A distributive lighting system typically has a centralized high-brightness light source, such as a halide metal discharge lamp. The light generated by the light source is coupled through light guides, such as bundled optical fibers or large-core light pipes, to a plurality of light output devices distributed at different locations. Distributive lighting systems offer many advantages over conventional lighting systems using discrete tungsten lamps or the like. A distributive lighting system is relatively cost-effective because only one light source is required to provide light for multiple light output devices. The high efficiency of the light source and the relatively low transmission losses of the light guides allow a distributive lighting system to have a high output efficiency. The separation of the light source from the output devices provides flexibility in the placement of the light source for convenient installation and maintenance. The relatively small dimensions of the light guides and the light output devices also allow distributive lighting systems to be used in many applications where space is restricted, such as in automobiles or airplanes.

The light output devices in a distributive lighting system are of critical importance to the performance of the lighting system. At the end of the light output chain, the light output device is responsible for shaping and projecting the light it receives from the light guide to form an output beam. One major technical challenge in designing a light output device is to generate an output beam with a desired beam shape and intensity distribution. Many applications require a well defined beam pattern with sharp boundary edges (i.e., sharp intensity cutoff at the beam boundary). Some proposed light output devices use a shade (or shutter) to form a sharp edge of the output beam. For example, U.S. Pat. No. 5,499,166 to Kato et al. discloses a light output device designed for use as an automobile headlight. A desired edge of the output beam is achieved by the use of a shade placed between the optical fiber (or light pipe) and the light output device.

The use of a shade, however, blocks a portion of the useable light and therefore compromises the overall efficiency of the lighting system. Another problem with such a device is that the beam boundary is still somewhat blurred due to the multiple internal reflections of the light passing through the output device.

Besides the need to generate a desired beam pattern, there are other considerations in designing a light output device. For instance, to maximize the efficiency of the lighting system, it is necessary to minimize the transmission losses and other losses of the light output device. A light output device should also have a simple and sturdy construction that allows easy installation and minimizes the need for adjustment and maintenance.

SUMMARY OF THE INVENTION

In view of the foregoing, it is an object of the invention to provide a light output device for use in a distributive lighting system that is configured to provide a controlled beam pattern with sharp intensity cutoff at the beam boundary.

It is a related object of the invention to provide a light output device that achieves sharp beam edges without the use of shades or shutters which tend to compromise the efficiency of the lighting system.

It is an object of the invention to provide a light output device for use in a distributive lighting system that minimizes transmission and reflective losses to achieve a high output efficiency of the lighting system.

It is another object of the invention to provide a light output device for use in a distributive lighting system that has a simple and sturdy construction to allow easy installation and maintenance.

In accordance with these and other objects of the invention, there is provided a monolithic light output device with a unitary construction which includes an elongated beam shaping rod connected to a solid lens by a conical transition section. The light output device receives light transmitted from a remote light source through a light guide (such as optical fibers or a light pipe) and converts the received light into a desired output beam pattern. The input end of the beam shaping rod is shaped for direct abutting contact with the light guide for receiving the input light. Light passing through the beam shaping rod undergoes multiple total internal reflections at the peripheral wall of the rod. The internal reflections modify the distribution of the input light to present a modified light source at the output end of the beam shaping rod. The modified light source, which is disposed in the focal plane of the solid lens, is projected by the solid lens to form the output beam.

In accordance with an aspect of the invention, sharp boundary edges of the output beam are achieved by forming the peripheral wall of the conical section to expand at an angle with respect to the beam axis that is equal or larger than the maximum exit angle of light from the modified light source. This arrangement prevents light reflections by the wall of the conical transition section, thereby preventing blurring of the edges of the output beam to provide sharp intensity cutoff at the beam boundary.

In accordance with another aspect of the invention a desired beam output pattern is achievable by configuring the beam shaping rod, such as by providing local surface slope variations on the wall of the beam shaping rod. The local surface slope variations redirect the light passing through the beam shaping rod to result in a desired distribution of the modified light source which is then projected by the solid lens to form the output beam.

Other objects and advantages will become apparent with reference to the following detailed description when taken in conjunction with the drawings in which:

Figure 1:
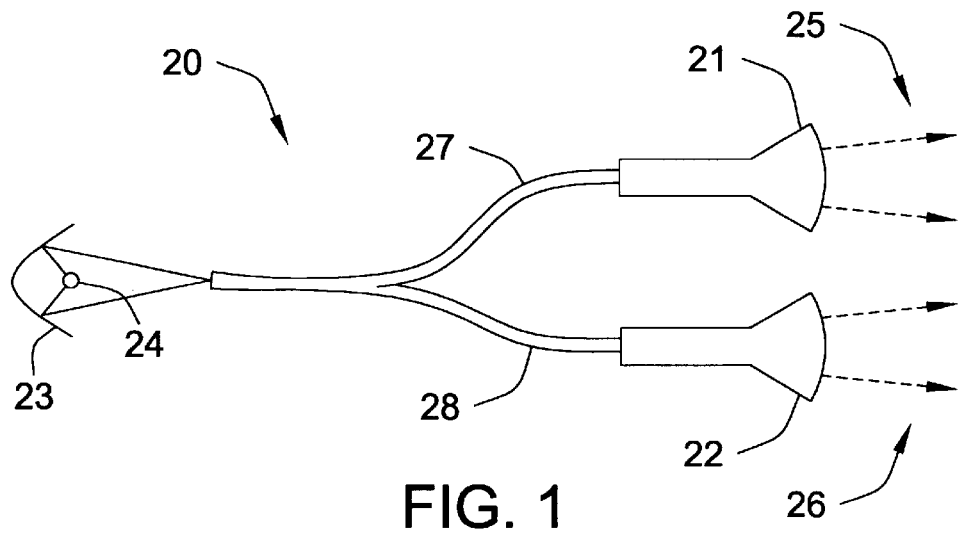
FIG. 1 is schematic diagram showing a distributive lighting system utilizing monolithic light output devices constructed according to the invention.

While the invention is susceptible of various modifications and alternative constructions, certain illustrated embodiments hereof have been shown in the drawings and will be described below. It should be understood, however, that there is no intention to limit the invention to the specific forms disclosed, but, on the contrary, the intention is to cover all modifications, alternative constructions and equivalents falling within the spirit and scope of the invention as defined by the appended claims.

DETAILED DESCRIPTION OF THE PREFERRED EMBODIMENT

Turning now to the drawings, FIG. 1 shows a distributive lighting system 20 which employs two monolithic light output devices 21, 22 constructed according to the invention. The distributive lighting system has a centralized light source 24 which generates light to be delivered to the light output devices to form the output beams 25, 26. The light source 24 preferably is a high-efficiency, high-brightness, source and has a short warm-up time. In a preferred embodiment, the light source 24 includes a halide metal discharge lamp. The light generated by the light source is concentrated by a collimating element 23, such as a concave mirror, into the input end of one or more light guides 27, 28 for transmission to the respective light output devices. The light guides 27, 28 are preferably large-core light pipes.

Figure 2:
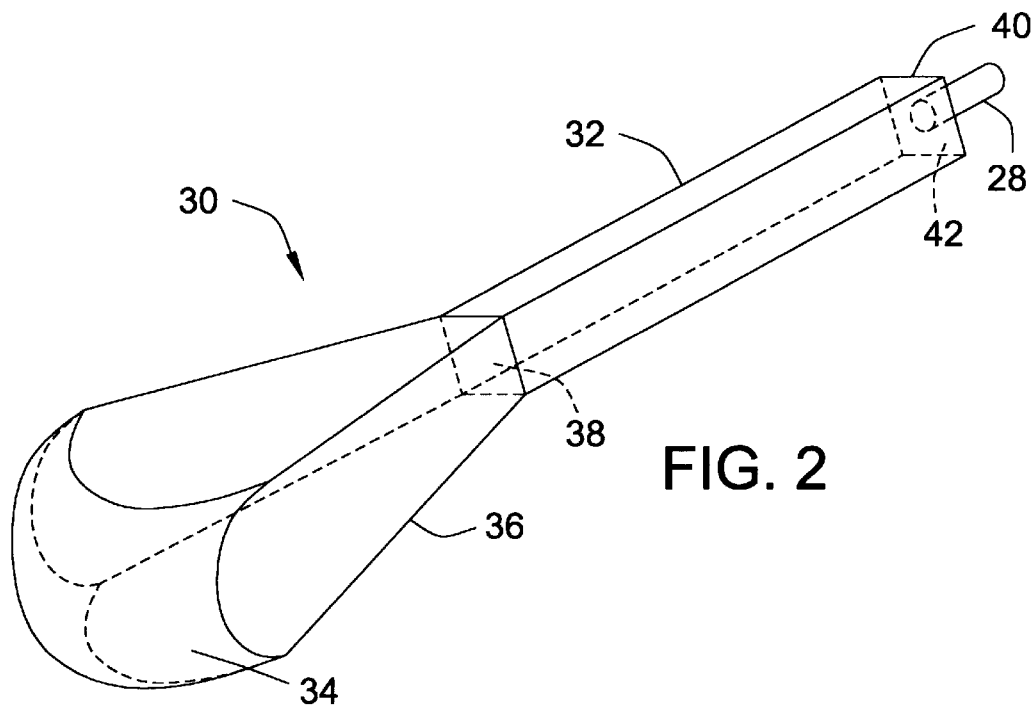
FIG. 2 is a perspective view of an embodiment of a monolithic light output device of the invention.
Figure 3:
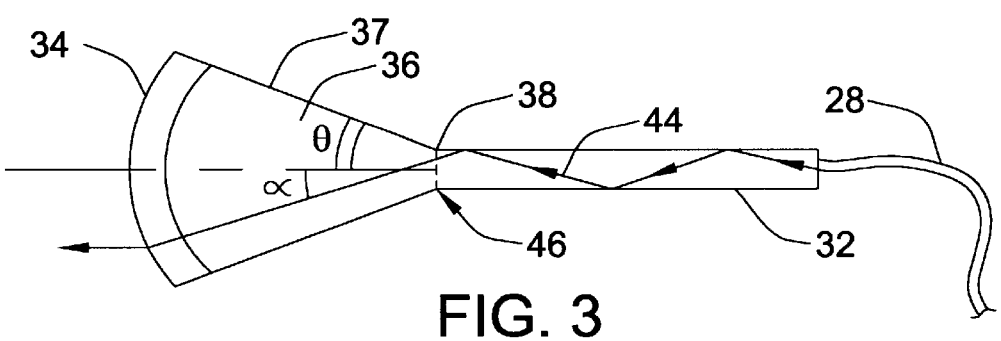
FIG. 3 is a cross sectional view of the light output device of FIG. 2.

FIGS. 2 and 3 show a light output device 30 constructed according to the invention. In accordance with a feature of the invention, the light output device 30 has a solid, monolithic, construction. The light output device includes a beam shaping rod 32, a solid lens 34, and a conical transition section 36 connecting the beam shaping rod and the solid lens. The output end plane 38 of the beam shaping rod 32 is disposed at the focal length of the solid lens 34. Light transmitted from the light source through the light guide 28 is coupled into the light output device through the input end 40 of the beam shaping rod. The input end 40 is preferably a flat polished surface to allow direct abutting engagement with the output end of the light guide 28 to minimize reflective losses. The light output device 30 is preferably formed of a light-transmitting material which has an index of refraction similar to that of the light guide 28 to minimize reflective losses at the interface between the light guide and the output device. In a preferred embodiment, the light output device is formed of molded acrylic.

The unitary construction of the light output device 30 has many advantages. Because light travels through the same medium from the input end 40 to the surface of the output lens 34, there is no discontinuity in the index of refraction within the light path to cause reflective losses. Moreover, the solid structure not only makes the light output device 30 easy to handle and install but also effectively eliminates any need for adjustment.

In accordance with a feature of the invention, the beam shaping rod 32 of the light output device 30 modifies the distribution of the light which enters through the input face 42 to produce a desired beam distribution at the out end of the beam shaping rod 32. As can be best seen in the cross-sectional view of FIG. 3, a ray 44 which enters the beam shaping rod at an angle goes through one or more total internal reflections at the peripheral wall of the beam shaping rod due to the difference between the indices of refraction of the light output device and the air. Depending on their initial positions and angles at the input face, different rays go through various numbers of total internal reflections in the beam shaping rod 32. Thus, the angular and positional distribution of the light passing through the beam shaping rod 32 is modified by means of total internal reflections. The modified light exiting the beam shaping rod 32 presents a modified light source 46 in the output end plane 38 of the beam shaping rod 32. This modified light source, which is at the focal length of the solid lens 34, is projected by the solid lens to form the output beam of the light output device. As will be described in greater detail below, the beam shaping rod 32 can be configured to achieve output beams of different shapes and intensity distributions.

In accordance with an aspect of the invention, an output beam with a well-defined pattern and sharp boundary edges is achieved by avoiding reflections in the conical transition section connecting the beam shaping rod and the solid lens. As shown in FIG. 3, light from the modified source 46 has a maximum exit angle α. Reflections of the light off the wall of the conical transition section are avoided by making the expansion angle θ of the wall 37 of the conical section 36 greater than the maximum exit angle α of the modified source. If light from the modified source is allowed to reflect off the wall of the conical section, the reflected light will form virtue light sources which spill light beyond the desired beam boundary, resulting in an undesirable light distribution and a blurring of the beam boundary edges. BY making the expansion angle θ greater than the maximum exit angle α of light from the modified source, unwanted reflections off the conical wall 37 are prevented. This allows the formation of a clear projection of the modified source 46 with sharp intensity cutoff at the boundary of the output beam.

Figure 4:
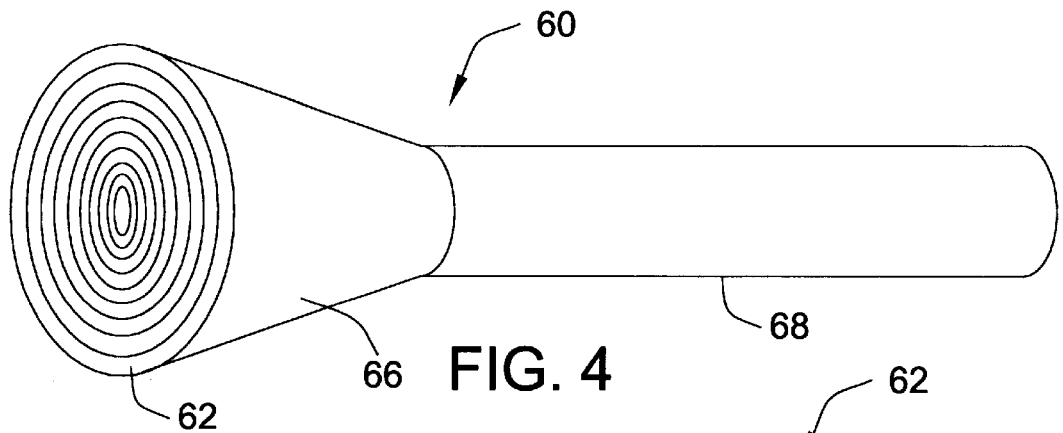
FIG. 4 is a perspective view of a light output device which has a Fresnel lens.

In certain applications, the maximum exit angle of the modified light source may be so large that it becomes difficult to form an asphere lens that matches the large expansion angle of the conical section required for avoiding reflection. In accordance with a feature of an alternative embodiment, the solid lens may be formed as a Fresnel lens instead of an asphere lens. A light output device 60 with a Fresnel lens 62 is shown in FIG. 4. As can be best seen in the cross-sectional view of FIGS. 4 and 5, the Fresnel lens 62 has a relatively wide acceptance angle which allows the conical section 66 connecting the Fresnel lens and the beam shaping rod 68 to be formed with a large expansion angle.

Figure 5:
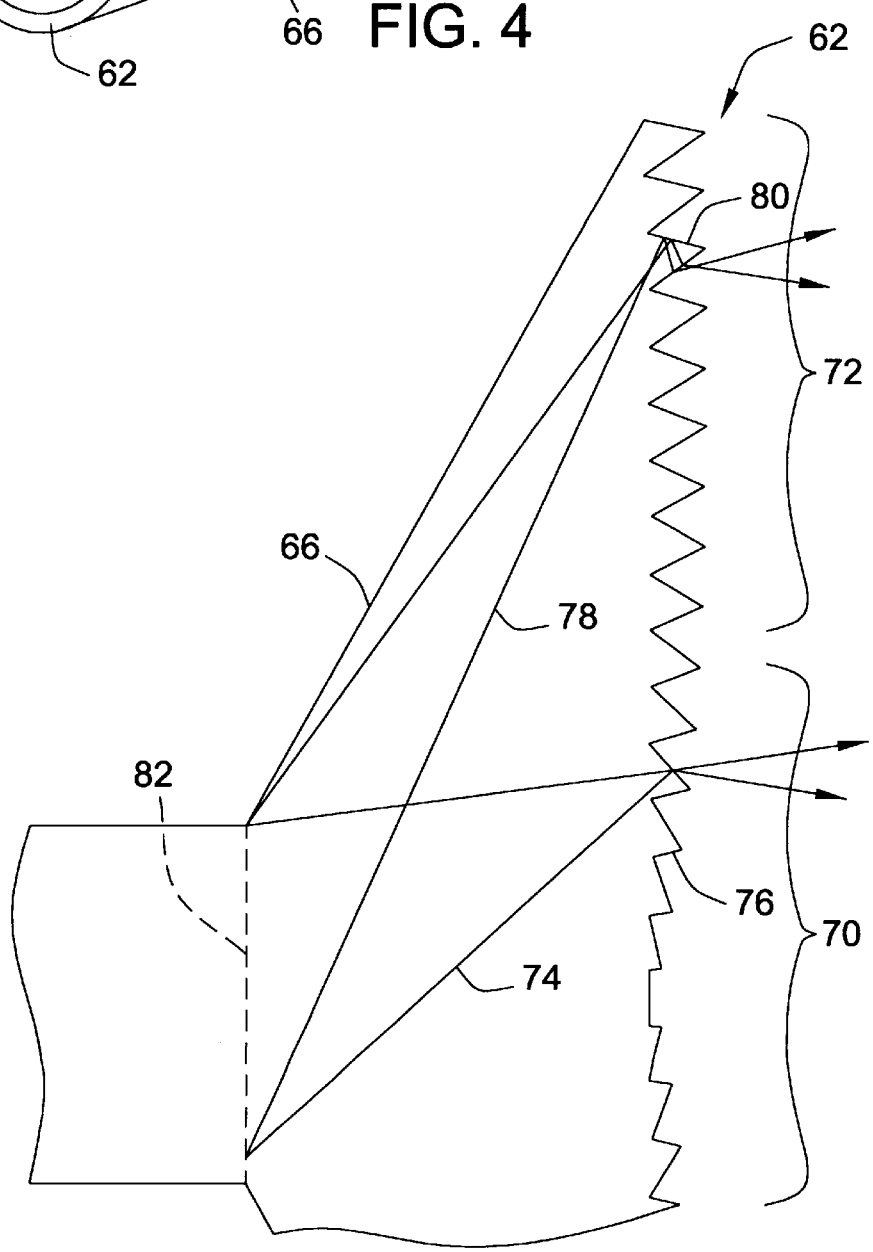
FIG. 5 is a cross-sectional view of the light output device of FIG. 4.

In a preferred embodiment as shown in FIG. 5, the Fresnel lens has two groups of concentric rings: an inner group 70 of refraction prism rings and an outer group 72 of total reflection prism rings. A ray 74 with a relatively small exit angle from the modified light source 82 is refracted by a refraction prism ring 76 on its path through the lens 62. In contrast, a ray 78 with a relatively large exit angle goes through a total internal reflection and then a refraction by a total reflection prism ring 80. The use of the total reflection prism rings 72 for rays at large exit angles from the modified light source reduces reflection losses through the Fresnel lens.

In accordance with an aspect of the invention, the beam shaping rod of the output device is configured to produce the desired output beam pattern, which includes both the shape and intensity distribution of the output beam. In the embodiment shown in FIG. 2, the beam shaping rod 32 has a rectangular cross section which is uniform along its entire length. Accordingly, the modified source 38 at the end of the beam shaping rod is rectangular in shape. The rectangular modified source 38 is projected by the solid lens 34 to form an output beam with a generally rectangular shape.

With the rectangular cross section of the beam shaping rod, the multiple total internal reflections of light passing through the beam shaping rod have the effect of producing a substantially uniform intensity distribution within the rectangular boundary of the output beam.

Figure 6:
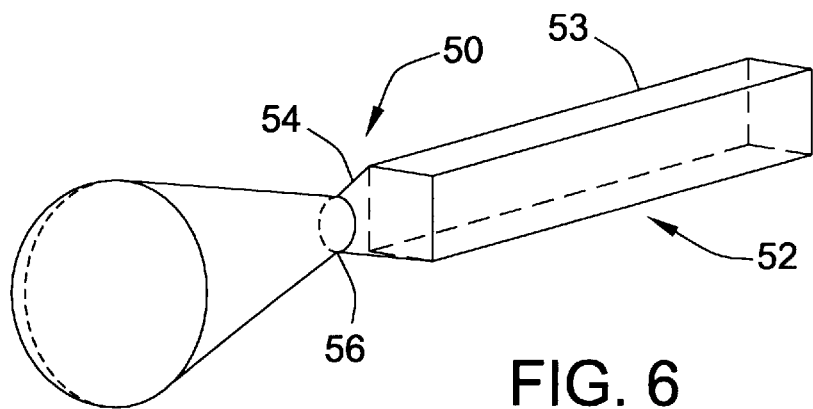
FIG. 6 is a perspective view of a light output device which has a beam converging section in its beam shaping rod.

Because the output beam is formed by projecting the modified source 38 at the end of the beam shaping rod, the shape of the modified source generally determines the shape of the output beam. As described above, the rectangular modified source of the light output device in FIG. 2 results in a rectangular output beam pattern, It will be appreciated that the modified source may be formed to have other shapes according to the desired output beam patterns. By way of example, FIG. 6 shows a light output device 50 which has a circular output beam pattern. The light output device 50 has a beam shaping rod 52 which has a first section 53 with a uniform rectangular cross section and a beam converging section 54 which is tapered from the rectangular end of the first section into a circular output end of the beam shaping rod. The rectangular section 53 of the beam shaping rod produces a substantially uniform light distribution, which is then shaped by the beam converging section 54 into a round modified source 56 at the end of the beam shaping rod. It will be appreciated that other output beam shapes may be obtained by forming the modified source into the desired shape.

Figure 7:
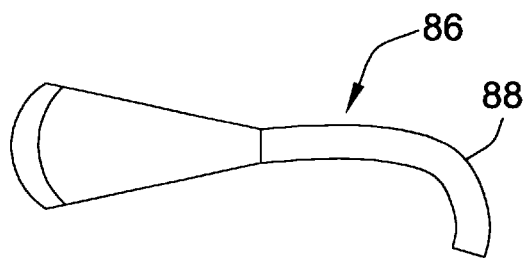
FIG. 7 is a side view of a light output device which has a curved beam shaping rod.
Figure 8:
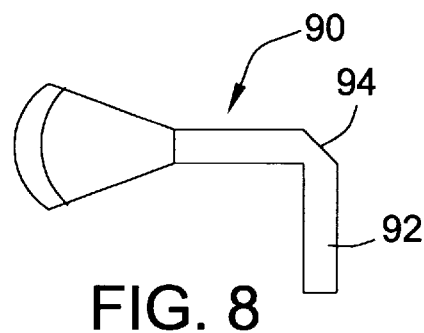
FIG. 8 is a side view of a light output device which has a bend in its beam shaping rod.

It will also be appreciated that the beam shaping rod is not limited to have a straight axis. By way of example, FIG. 7 shows a light output device 86 which has a beam shaping rod 88 with a curved longitudinal axis. FIG. 8 shows another light output device 90 which has a right-angle bend in its beam shaping rod 92. A flat prism surface 94 at the bend disposed at 45 degrees with respect to both the input and output sections of the rod 92 reflects light from the input section into the output section.

The function of the beam shaping rod is to define not only the desired beam shape but also the desired intensity distribution of the output beam. It has been described above that a rectangular beam shaping rod may be used to achieve a generally uniform beam distribution, which is desirable in many applications. Nevertheless, the present invention is not limited to uniform beam patterns, and the beam shaping rod can be configured to provide different non-uniform beam patterns. As described above, the beam shaping rod modifies the light distribution by means of total internal reflections. In according with an aspect of the invention, the total internal reflections are controlled to produce a desired light distribution by selectively forming one or more local surface slope variations on the peripheral wall of the beam shaping rod. The term "local surface slope variation" as used herein refers to a facet or surface patch on the wall of the beam shaping rod that is not parallel to the axis of the rod. The local surface slope variations redirect light inside the beam shaping rod by means of total internal reflections to generate the desired light distribution.

Figure 9:
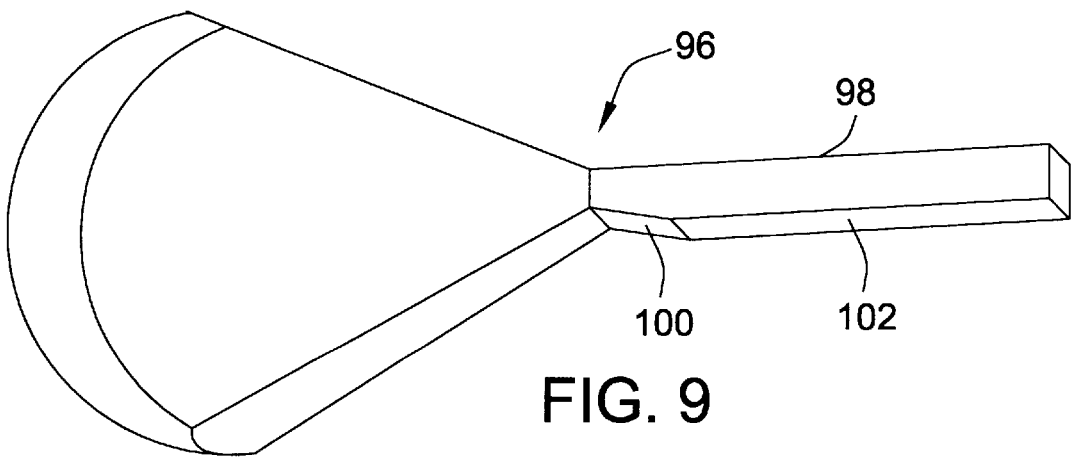
FIG. 9 is a perspective view of a light output device which has a prism facet formed on its beam shaping rod.
Figure 10:
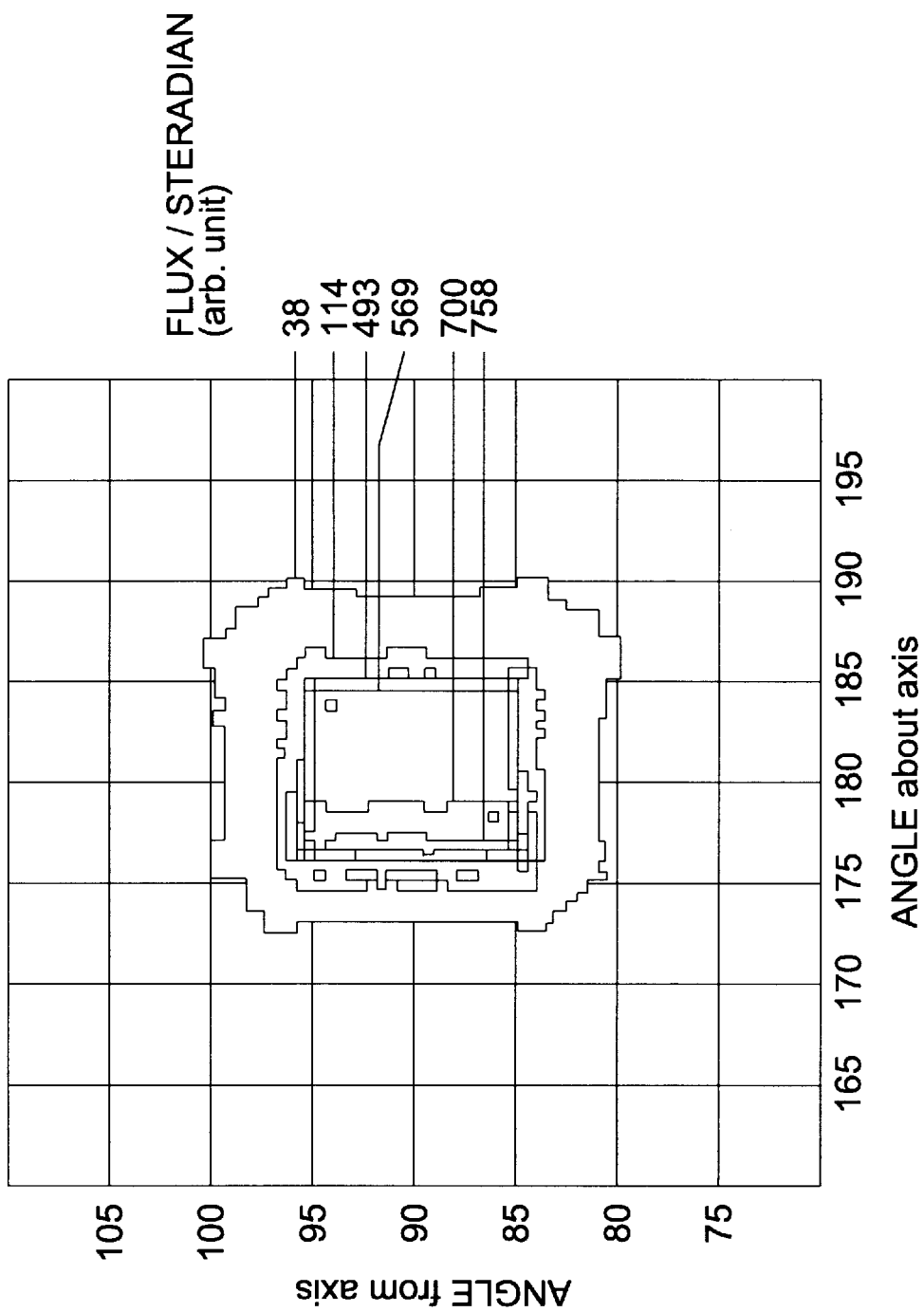
FIG. 10 is a graph showing a simulated beam intensity distribution of the output beam of the light output device of FIG. 9.
Figure 11:
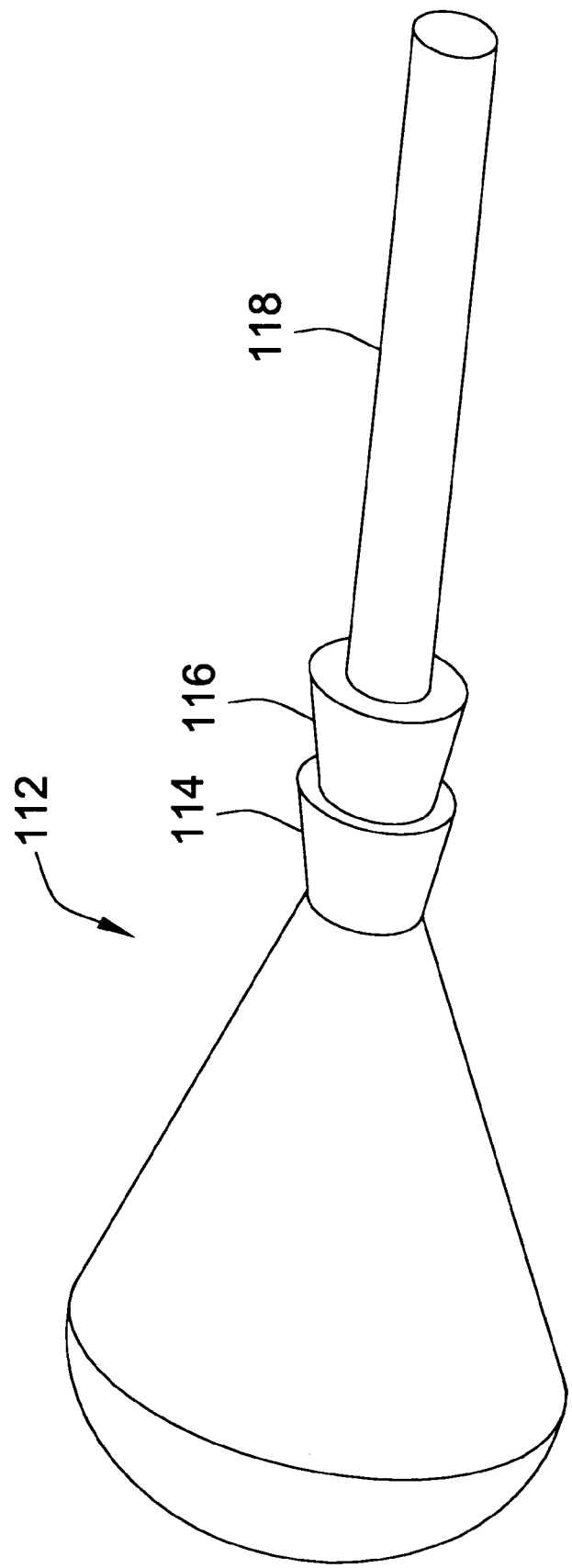
FIG. 11 is a perspective view of light output device that has two prism rings formed on its beam shaping rod.

By way of example, FIG. 9 shows a light output device 96 for producing a rectangular output beam with an uneven intensity distribution. The beam shaping rod 98 is essentially a rectangular rod but with the output end slightly relieved to form a prism facet 100 which is at an angle with respect to the adjacent wall surface 102. When a ray is reflected from this prism facet 100, the angle between the ray and the axis of the rectangular section of the rod is increased. This has the effect of creating an uneven distribution of the beam intensity. FIG. 10 shows a plot of the output beam intensity distribution in terms of iso-candela curves generated by a ray-tracing simulation for such a light output device. As shown in FIG. 10, the prism facet has the effect of shifting the intensity toward one side of the beam. As another example of the use of local surface slope variations to control the output beam intensity distribution, FIG. 11 shows a light output device 112 that has a circular output beam pattern. Two prism rings 114, 116 are formed near the output end of the generally cylindrical beam shaping rod 118. The prism rings 114, 116 have the effect of increasing the maximum exit angle of light from the modified source at the end plane of the beam shaping rod.

By providing local surface slope variations selectively positioned on the wall of the beam shaping rod, different uneven distribution patterns may be achieved. Due to the complex results of multiple internal reflections of light rays in the beam shaping rod, the design of the surface configuration of the beam shaping rod for obtaining a desired beam pattern is often performed with the aid of ray-tracing simulation techniques which are generally known to those skilled in the art.

In view of the foregoing detailed description, it can be appreciated that the invention provides a monolithic light output device which can be advantageously used in a distributive lighting system to provide an output beam with sharp edges and a controlled intensity distribution. This light output device effectively separates the beam shaping function and the imaging function by performing the former with a beam shaping rod and the latter with a solid lens. The beam shaping rod of the light output device is configured to provide a desired shape and intensity distribution of the output beam. Sharp edges of the output beam are achieved by forming the wall of the conical transition section of the light output device to have an expansion angle greater than the maximum exit angle of light from the modified source at the end of the beam shaping rod. The solid lens can be formed as a Fresnel lens to accommodate a large expansion angle of the conical section.

What is claimed is:

1. A monolithic beam shaping light output device for coupling to an optical fiber to convert an input light beam from the optical fiber into an output beam, comprising:

a unitary body of light-transmitting material having an elongated beam shaping rod, a conical transition section, and an imaging lens, the beam shaping rod having input and output ends, an input surface at the input end for direct abutting contact with said optical fiber for receiving the input light beam, and a peripheral wall extending between the input and output ends for modifying distribution of the input light beam via total internal reflection to present a modified light source at the output end which emits light bounded by a maximum ray angle from a beam axis;

the conical section having a small end joining the output end of the beam shaping rod, a large end opposite the small end, and a conical peripheral wall extending between the small end and the large end, the conical peripheral wall expanding at a cone angle with respect to the beam axis that is equal to or larger than the maximum ray angle;

the imaging lens being integrally formed at the large end of the conical section for imaging the modified light source at the output end of the beam shaping rod into said output beam.

2. A monolithic beam shaping light output device as in claim 1, wherein the imaging lens is an asphere lens.

3. A monolithic beam shaping light output device as in claim 1, wherein the imaging lens is a Fresnel lens.

4. A monolithic beam shaping light output device as in claim 3, wherein the Fresnel lens includes inner refraction prism rings and outer total-internal-reflection prism rings for imaging the modified light source at the output end of the beam shaping rod.

5. A monolithic beam shaping light output device as in claim 1, wherein the beam shaping rod has a straight longitudinal axis.

6. A monolithic beam shaping light output device as in claim 1, wherein the beam shaping rod includes a curved section.

7. A monolithic beam shaping light output device as in claim 1, wherein the beam shaping rod has a bend.

8. A monolithic beam shaping light output device as in claim 1, wherein the peripheral wall of the beam shaping rod has local surface slope variations for redirecting light within the beam shaping rod via total internal reflections.

9. A monolithic beam shaping light output device as in claim 1, wherein the unitary body is formed of acrylic.

10. A monolithic beam shaping light output device for coupling to an optical fiber to convert an input light beam from the optical fiber into an output beam, comprising:

a unitary body of light-transmitting material having an elongated beam shaping rod, a conical transition section, and an imaging lens, the beam shaping rod having input and output ends, an input surface at the input end for direct abutting contact with said optical fiber for receiving the input light beam, and a peripheral wall extending between the input and output ends for modifying distribution of the input light beam via total internal reflections to present a modified light source at the output end, the beam shaping rod having local surface slope variations on the peripheral wall for redirecting light within the beam shaping rod via total internal reflections;

the conical section having a small end joining the output end of the beam shaping rod, a large end opposite the small end, and a conical peripheral wall extending between the small end and the large end, the imaging lens being integrally formed at the large end of the conical section for imaging the modified light source at the output end of the beam shaping rod into said output beam.

11. A monolithic beam shaping light output device as in claim 10, wherein the local surface slope variations include a prism surface formed on the peripheral wall of the beam shaping rod.

12. A monolithic beam shaping light output device as in claim 10, wherein the imaging lens is an asphere lens.

13. A monolithic beam shaping light output device as in claim 10, wherein the imaging lens is a Fresnel lens.

14. A monolithic beam shaping light output device as in claim 13, wherein the Fresnel lens includes inner refraction prism rings and outer total-internal-reflection prism rings for imaging the modified light source at the output end of the beam shaping rod.

15. A monolithic beam shaping light output device as in claim 10, wherein the modified light source emits light bounded by a maximum ray angle from a beam axis, and the conical peripheral wall of the cone section expands at a cone angle with respect to the beam axis that is equal to or larger than the maximum ray angle.

16. A monolithic beam shaping light output device as in claim 10, wherein the beam shaping rod has a straight longitudinal axis.

17. A monolithic beam shaping light output device as in claim 10, wherein the beam shaping rod includes a curved section.

18. A monolithic beam shaping light output device as in claim 10, wherein the beam shaping rod has a bend.

19. A lighting system comprising:

a light source;

a light guide having first and second ends, the first end optically coupled to the light source for receiving light therefrom and transmitting the light to the second end of the fiber to form an input light beam;

a monolithic beam shaping light output device having a unitary body of light-transmitting material which includes an elongated beam shaping rod, a conical transition section, and an imaging lens, the beam shaping rod having input and output ends, an input surface at the input end for direct abutting coupling with the second end of the optical fiber for receiving the input light beam therefrom, a peripheral wall extending between the input and output ends for modifying distribution of the input light beam by total internal reflections to present at the output end a modified light source which emits light bounded by a maximum exit angle from a beam axis, the conical transition section having a small end joining the output end of the beam shaping rod, a large end opposite the small end, and a conical peripheral wall extending between the small and large ends, the conical peripheral wall expanding at an expansion angle with respect to the beam axis that is equal to or larger than the maximum ray angle, the imaging lens being integrally formed at the large end of the conical section for imaging the modified light source at the output end of the beam shaping rod into an output beam.

20. A lighting system as in claim 19, wherein the peripheral wall of the beam shaping rod includes local surface slope variations for redirecting light within the beam shaping rod via total internal reflections.

21. A lighting system as in claim 20, wherein the local surface slope variations include a prism surface formed on the peripheral wall of the beam shaping rod.

22. A lighting system as in claim 19, wherein the light-transmitting material forming the unitary body of the beam shaping light output device is acrylic.

23. A lighting system as in claim 19, wherein the light-transmitting material forming the unitary body of the beam shaping light output device has an index of refraction matching an index of refraction of the optical fiber.

24. A lighting system as in claim 19, wherein the imaging lens is an asphere lens.

25. A lighting system as in claim 19, wherein the imaging lens is a Fresnel lens.

26. A lighting system as in claim 25, wherein the Fresnel lens includes inner refraction prism rings and outer total-internal-reflection prism rings for imaging the modified light source.

* * * * *